United States Patent
Deng et al.

(10) Patent No.: US 7,622,874 B2
(45) Date of Patent: Nov. 24, 2009

(54) OVER CURRENT DETECTION CIRCUITS FOR MOTOR DRIVER

(75) Inventors: Chunxing Deng, Shenzhen (CN); Wenli Luo, Shenzhen (CN)

(73) Assignee: Shenzhen STS Microelectronics Co., Ltd. (CN)

( * ) Notice: Subject to any disclaimer, the term of this patent is extended or adjusted under 35 U.S.C. 154(b) by 169 days.

(21) Appl. No.: 11/693,989

(22) Filed: Mar. 30, 2007
(Under 37 CFR 1.47)

(65) Prior Publication Data
US 2008/0278870 A1    Nov. 13, 2008

(30) Foreign Application Priority Data
Mar. 31, 2006    (CN) .................... 2006 1 0071969

(51) Int. Cl.
    *H02H 7/09*    (2006.01)
(52) U.S. Cl. ............... 318/400.22; 318/474; 361/31
(58) Field of Classification Search ............ 318/400.22, 318/474; 361/31
    See application file for complete search history.

(56) References Cited

U.S. PATENT DOCUMENTS

| | | | | |
|---|---|---|---|---|
| 4,435,749 A | * | 3/1984 | Grubbs ..................... | 363/58 |
| 5,457,364 A | * | 10/1995 | Bilotti et al. ................ | 318/434 |
| 5,642,247 A | * | 6/1997 | Giordano .................... | 361/31 |
| 5,773,945 A | * | 6/1998 | Kim et al. ................... | 318/434 |
| 5,801,503 A | * | 9/1998 | Kim et al. ................... | 318/434 |
| 6,741,047 B2 | * | 5/2004 | Horng et al. ............ | 318/400.22 |
| 7,239,182 B2 | * | 7/2007 | Fukazawa et al. ............ | 326/83 |

FOREIGN PATENT DOCUMENTS

JP    2000-082946    *    3/2000

\* cited by examiner

*Primary Examiner*—Bentsu Ro
*Assistant Examiner*—David S Luo
(74) *Attorney, Agent, or Firm*—Lisa K. Jorgenson; William J. Kubida

(57) ABSTRACT

A motor driver includes an H-bridge having a first differential input, a second differential input, and a differential output; a sensing circuit coupled to the differential output of the H-bridge; a comparison and logic circuit coupled to the sensing circuit; a pair of pre-driver circuits coupled to the comparison and logic circuit for driving at least one of the differential inputs of the H-bridge; and a pair of level shifters coupled between the comparison and logic circuit and the sensing circuit. The pair of level shifters is used to assure that the $V_{GS}$ of a pair of serially coupled transistors in the sensing circuit do not change with temperature, motor current, or voltage, and each includes a transistor receiving a reference current. The pair of level shifters each further includes a serially coupled diode and zener diode for preventing current from flowing from the differential output of the H-bridge to the level-shifting transistor.

14 Claims, 8 Drawing Sheets

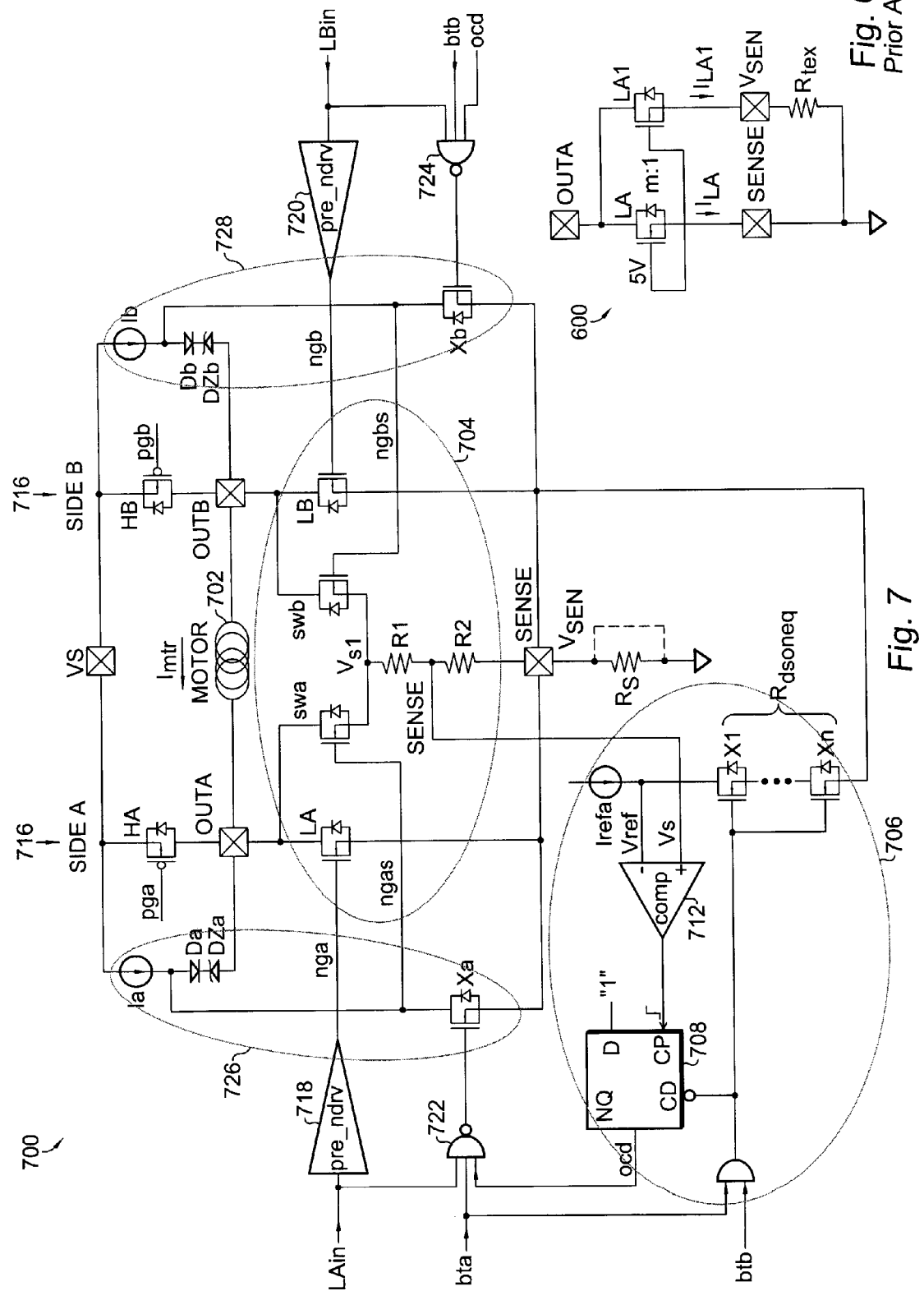

OVER CURRENT DETECTION CIRCUITS FOR MOTOR DRIVER

RELATED APPLICATION

The present application claims priority of Chinese Application No. 200610071969.3 filed Mar. 31, 2006, which is incorporated herein in its entirety by this reference.

FIELD OF THE INVENTION

The present invention is related to motor driver integrated circuits and, more particularly, to motor driver circuits including an over current detection ("OCD") circuit.

BACKGROUND OF THE INVENTION

In a motor system 100, a flexible motor driver IC 104 includes synchronous rectification for low power dissipation and can be used to drive not only a DC motor 102 but also a stepper motor 106 shown in FIG. 1. Motor driver IC 104 is externally controlled by a μC 108, which is coupled to internal pulse-width modulation ("PWM") and control logic block 110. The sense resistor $R_{S1}$ between the SENSE1 node and ground is used for driving stepper motor 106. When driving the DC motor 102, $R_{S1}$ is shorted to ground. Resistor $R_{S2}$ ideally has the same value as $R_{S1}$. Blanking time of "bta" or "btb" generated with "Lain" or "LBin" is applied to pre-driver and OCD circuits 112 and 114 used for pre-driving H-bridges 116 and 118, and for OCD. When OCD happens, the outputs of H-bridges 116 and 118 are tri-stated until the next PWM pulse arrives.

When a PWM off-cycle is triggered, either by a bridge disable command or an off-time cycle, synchronous rectification is activated. The motor driver IC 104 turns on the appropriate power DMOS device with low $R_{dson}$ during the current decay to short the body diodes effectively. This feature can eliminate the need for external Schottky diodes for most applications, saving cost and external component count, while minimizing power dissipation significantly.

Referring now to FIG. 2, a portion of a motor driver system 200 is shown including an H-bridge 202, a motor 204, and a sense resistor RS. Normally, in the driver system 200 shown in FIG. 2 there are three kinds of current decay modes, which are fast decay, slow decay and mixed decay. The normal "on" current flow is I1, the fast decay path is I2, and the slow decay path is I3. The mixed decay path is a combination of I2 and I3 during the "off" time.

In the case where a longer time is required to turn a DC motor on or a fast decay with synchronous rectification occurs, a large current in the coil of motor 204 is produced. For a stepper motor, there are some accidents that can cause a large current occurrence in motor 204. For example, if sense resistor $R_S$ becomes small or shorted to ground suddenly, or if there is a longer decay time, either will cause a large current to flow. The larger than normal current can damage the motor 204 and coil. So it is mandatory to provide over current protection in a motor driver IC.

The traditional motor driver circuit 300 with over current detection protection for a DC motor 302 is shown in FIG. 3, which includes a sense portion 304 and a comparison portion 306. The sense portion 304 includes sensing transistors Msa and Msb. The comparison portion 306 includes sense resistors Rsa and Rsb, reference resistors Rrefa and Rrefb, reference current sources Irefa and Irefb, flip-flops 308 and 310, and comparators 312 and 314. Circuit 300 also includes an H-bridge 316, pre-driver circuits 318 and 320, and logic gates 322 and 324.

In the traditional structure shown in FIG. 3, side A and side B of H-bridge 316 have separate sense 304 and comparison 306 portions. The separated OCD structure shown in FIG. 3 causes undesirable different detection thresholds for each side due to process variations in the integrated circuit.

Referring now to FIG. 4, a traditional OCD circuit for "side A" of the H-bridge is shown. The sense part includes a current mirror of transistor LA from the H-bridge and sensing transistor Msa with a cell ratio of "n", and a current sense resistor of $R_{sa}$. Also shown in FIG. 4 is comparator 412, reference current Irefa, and reference resistor Rrefa.

Referring now to FIG. 5, an additional traditional OCD circuit for "side A" of the H-bridge is shown. The sense part includes a current mirror of transistor LA from the H-bridge and sensing transistor Msa with a cell ratio of "n", and a current sense resistor of $R_{sa}$. Also shown in FIG. 5 is comparator 512, reference current Irefa, reference resistor Rrefa, as well as external sense resistor Rtex coupled to the SENSE node.

When transistors LA and Msa work in the triode mode, their drain currents can be expressed as follows:

$$I_{LA} = K_{LA} \times \left[ (V_{gsLA} - V_{thLA}) \times V_{dsLA} - \frac{V_{dsLA}^2}{2} \right] \quad (1)$$

$$I_{Msa} = K_{Msa} \times \left[ \begin{array}{c} (V_{gsLA} - V_{sa} - V_{thMsa}) \times \\ (V_{dsLA} - V_{sa}) - \frac{(V_{dsLA} - V_{sa})^2}{2} \end{array} \right] \quad (2)$$

where $V_{dsMsa} = V_{dsLA} - V_{sa}$ $\quad V_{gsMsa} = V_{gsLA} - V_{sa}$ $V_{thLA} = V_{thMsa} = V_{th}$ Setting the mirroring factor $n_1$ is expressed by:

$$n_1 = \frac{I_{LA}}{I_{Msa}} \quad (3)$$

Substituting (1) and (2) into (3), $n_1$ results in:

$$n_1 = \frac{K_{LA} \times \left[ (V_{gsLA} - V_{th}) \times V_{dsLA} - \frac{V_{dsLA}^2}{2} \right]}{K_{Msa} \times \left[ \begin{array}{c} (V_{gsLA} - V_{sa} - V_{th}) \times \\ (V_{dsLA} - V_{sa}) - \frac{(V_{dsLA} - V_{sa})^2}{2} \end{array} \right]} \quad (4)$$

The cell ratio of n is expressed by:

$$n = \frac{K_{LA}}{K_{Msa}} \quad (5)$$

Thus (4) can be simplified as follows:

$$n = \frac{n}{1 - \frac{V_{sa} \times \left( V_{gsLA} - V_{th} - \frac{V_{sa}}{2} \right)}{V_{dsLA} \times \left( V_{gsLA} - V_{th} - \frac{V_{dsLA}}{2} \right)}} \quad (6)$$

Assuming $V_{sa}$ and $V_{dsLA}$ are smaller than $V_{gsLA}$ and $V_{th}$, $n_1$ can be simplified by:

$$n_1 = \frac{n}{1 - \frac{V_{sa}}{V_{dsLA}}} \quad (7)$$

So $V_{sa}$ is traded off between the mirrored current of $I_{Msa}$ and sense resistance of $R_{sa}$.

And $$V_{sa} = R_{sa} \times I_{Msa} \quad (8)$$

$$V_{dsLA} = R_{dsonLA} \times I_{LA} \quad (9)$$

Substituting (8) and (9) into (7), $n_1$ can be expressed by:

$$n_1 = n + \frac{R_{sa}}{R_{dsonLA}} \quad (10)$$

As is known, $R_{dsonLA}$ is a function of temperature, and so $n_1$ also changes with temperature.

$V_{sa}$ can also be expressed by:

$$V_{sa} = \frac{I_{LA}}{n_1} \times R_{sa} = \frac{I_{LA}}{n} \times \left(1 - \frac{V_{sa}}{V_{dsLA}}\right) \times R_{sa} \quad (11)$$

thus:

$$V_{sa} = \frac{I_{LA}}{\frac{n}{R_{sa}} + \frac{1}{R_{dsonLA}}} \quad (12)$$

and $V_{refa}$ is obtained by:

$$V_{refa} = I_{refa} \times R_{refa} \quad (13)$$

From (11) and (12), it can be seen that $V_{Msa}$ and $V_{refa}$ have no similar temperature feature.

Assuming $V_{Msa}$ is equal to $V_{refa}$, the threshed OCD current of $I_{thocd}$ is obtained by:

$$I_{thocd} = \frac{R_{refa}}{R_{sa}} \times n_1 \times I_{refa} = \left(\frac{R_{refa}}{R_{sa}} \times n + \frac{R_{refa}}{R_{dsLA}}\right) \times I_{refa} \quad (14)$$

If $R_{refa}$ and $R_{sa}$ are the same type of resistor, $I_{thocd}$ depends on n, and the ratio of $R_{refa}$ and $R_{dsLA}$, but $R_{refa}$ and $R_{dsLA}$ are different type resistors. Therefore $I_{thocd}$ also changes with temperature and process variation.

Normally, from the SENSE pin to ground there is an external trace resistance of $R_{tex}$ as shown in FIG. 5. When $I_{LA}$ flows through $R_{tex}$, a voltage drop of $V_{SEN}$ is generated as shown in FIG. 6.

Comparing circuit 600 in FIG. 6 to circuit 400 of FIG. 4, if LA1 and $R_{tex}$ are compared to Msa and $R_{sa}$ respectively, similar results are obtained. Setting the mirroring factor of $m_1$ between LA and LA1 is expressed by:

$$m_1 = \frac{I_{LA}}{I_{LA1}} = \frac{m}{1 - \frac{V_{SEN}}{V_{dsLA}}} \quad (15)$$

where m is the cell ratio of LA and LA1.

From (15), it is known that when $V_{SEN}$ increases, $m_1$ increases. In other words, the drain current flowing through LA decreases with respect to size, which means m is equal to one.

Thus, $V_{SEN}$ is equal to:

$$V_{SEN} = R_{tex} \times I_{LA1} \quad (16)$$

As a result, when $R_{tex}$ increases, $V_{SEN}$ increases, $m_1$ decreases, $n_1$ decreases according to (3), and consequently $I_{thocd}$ decreases according to (14).

It is important to note that $R_{tex}$ contains a sense resistor of $R_s$ for driving a stepper motor, and therefore $I_{thocd}$ is affected by $R_{tex}$ significantly. In other words, a motor driver IC has a different $I_{thocd}$ for driving a DC motor and a stepper motor.

In summary, the traditional OCD circuits and method described above has certain drawbacks. Firstly, The separated OCD structure could cause a different $I_{thocd}$ for each side in the H-bridge. Secondly, the sense voltage of $V_{Msa}$ and $V_{ref}$ have similar variation with temperature and process variations. Thirdly, $I_{thocd}$ is sensitive to temperature and process variations as well as SENSE pin voltage. Fourthly, there is a different $I_{thocd}$ for driving stepper and DC motors due to the different external sense resistor $R_S$.

What is desired, therefore is an OCD circuit for a motor driver integrated circuit that is able to overcome each of these four drawbacks associated with the conventional prior art OCD motor driver circuits.

SUMMARY OF THE INVENTION

According to an embodiment of the invention, a motor driver having over current detection circuitry includes an H-bridge having a first differential input, a second differential input, and a differential output; a sensing circuit coupled to the differential output of the H-bridge; a comparison and logic circuit coupled to the sensing circuit; a pair of pre-driver circuits coupled to the comparison and logic circuit for driving at least one of the differential inputs of the H-bridge; and a pair of level shifters coupled between the comparison and logic circuit and the sensing circuit. The H-bridge includes a first side having a first transistor coupled to a second transistor, and a second side having a third transistor coupled to a fourth transistor. The first and third transistors are power PDMOS transistors, and the second and fourth transistors are power NDMOS transistors. The pair of level shifters are used to assure that the $V_{GS}$ of a pair of serially coupled transistors in the sensing circuit do not change with temperature, motor current, or voltage, and each include a transistor receiving a reference current. The pair of level shifters each further includes a serially coupled diode and zener diode for preventing current from flowing from the differential output of the H-bridge to the level-shifting transistor. The sensing circuitry further includes a resistive divider coupled to a junction between the pair of transistors in the sensing circuit having an output coupled to the comparison and logic circuit. The comparison and logic circuit provides a logic signal to the pre-driver circuits in an over current condition.

The foregoing and other features, utilities and advantages of the invention will be apparent from the following more particular description of an embodiment of the invention as illustrated in the accompanying drawings.

BRIEF DESCRIPTION OF THE DRAWINGS

FIG. 6 is a simplified circuit diagram useful for comparing drain current with and without $R_{tex}$ according to the prior art;

FIG. 7 is a schematic diagram of a motor driver circuit including an OCD circuit according to the present invention;

DETAILED DESCRIPTION

Figure 1:
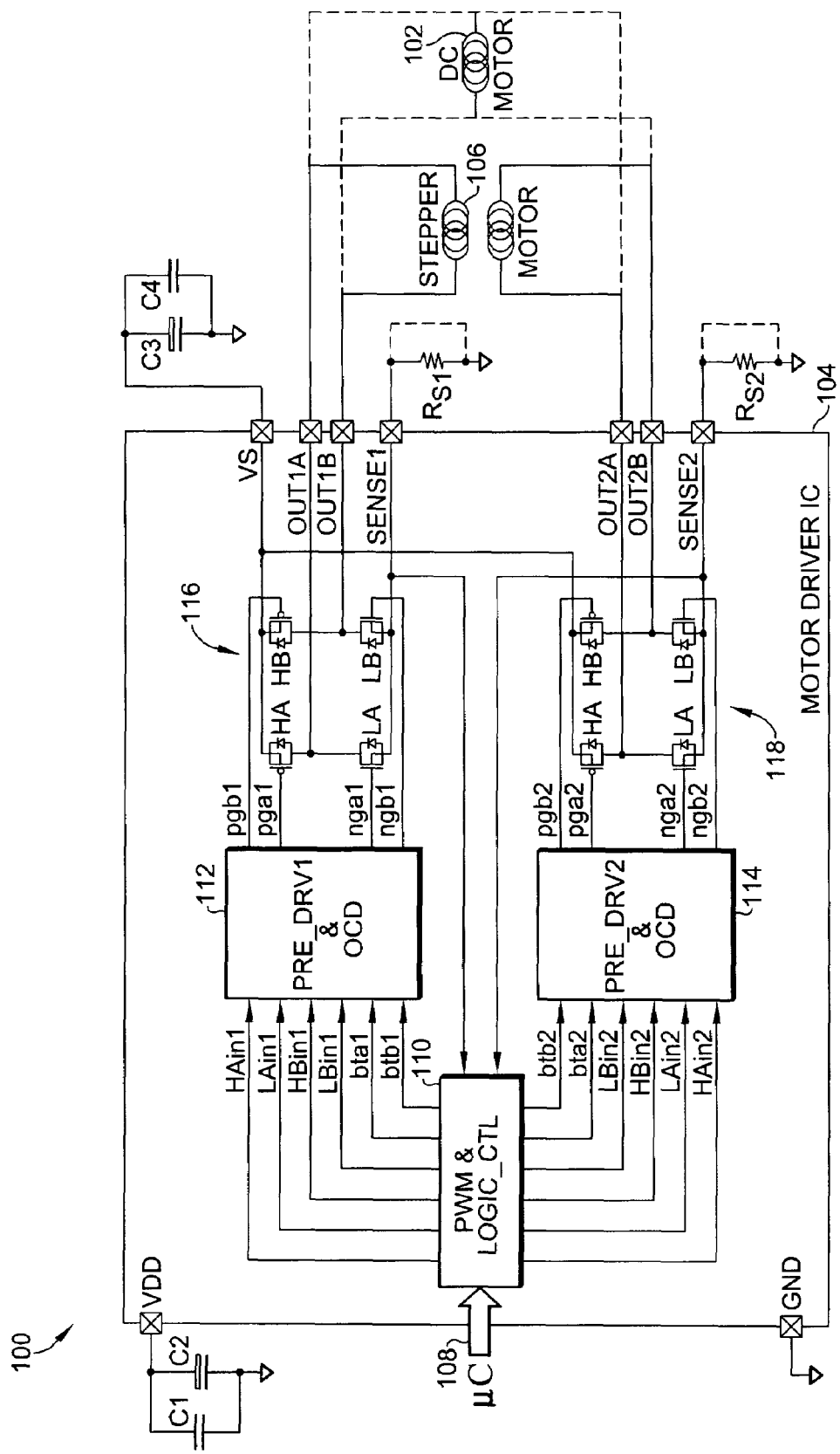
FIG. 1 is an application diagram of a flexible motor driver IC according to the prior art.
Figure 2:
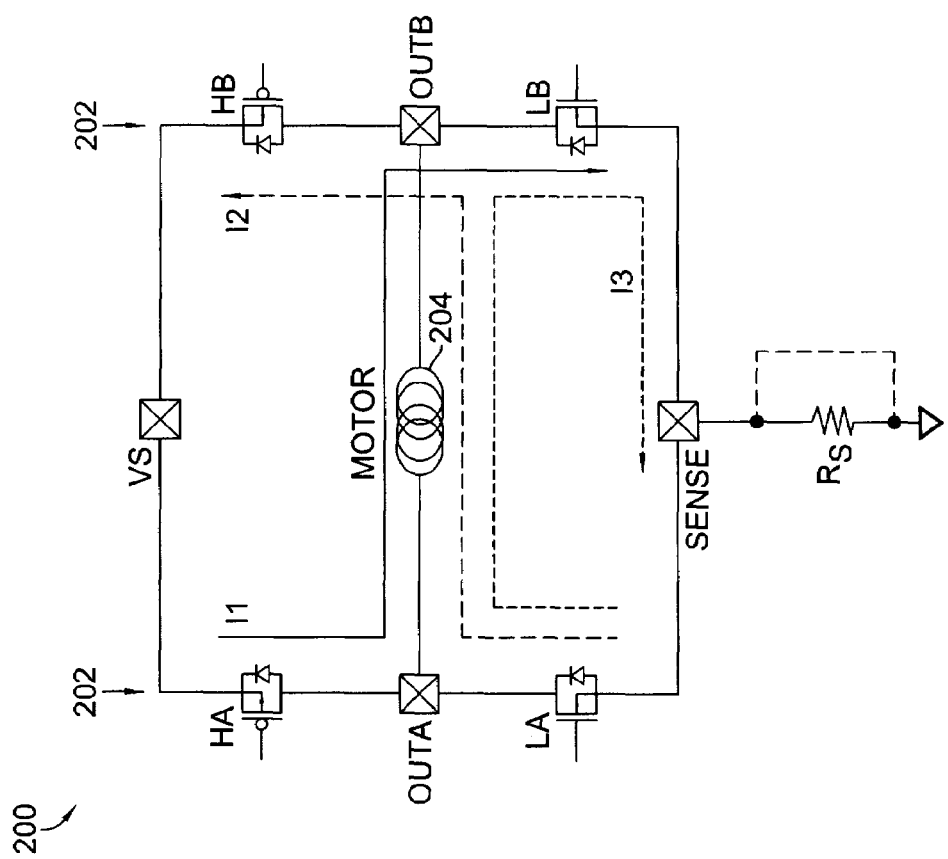
FIG. 2 is a schematic diagram of current decay modes in a motor driver circuit according to the prior art.
Figure 3:
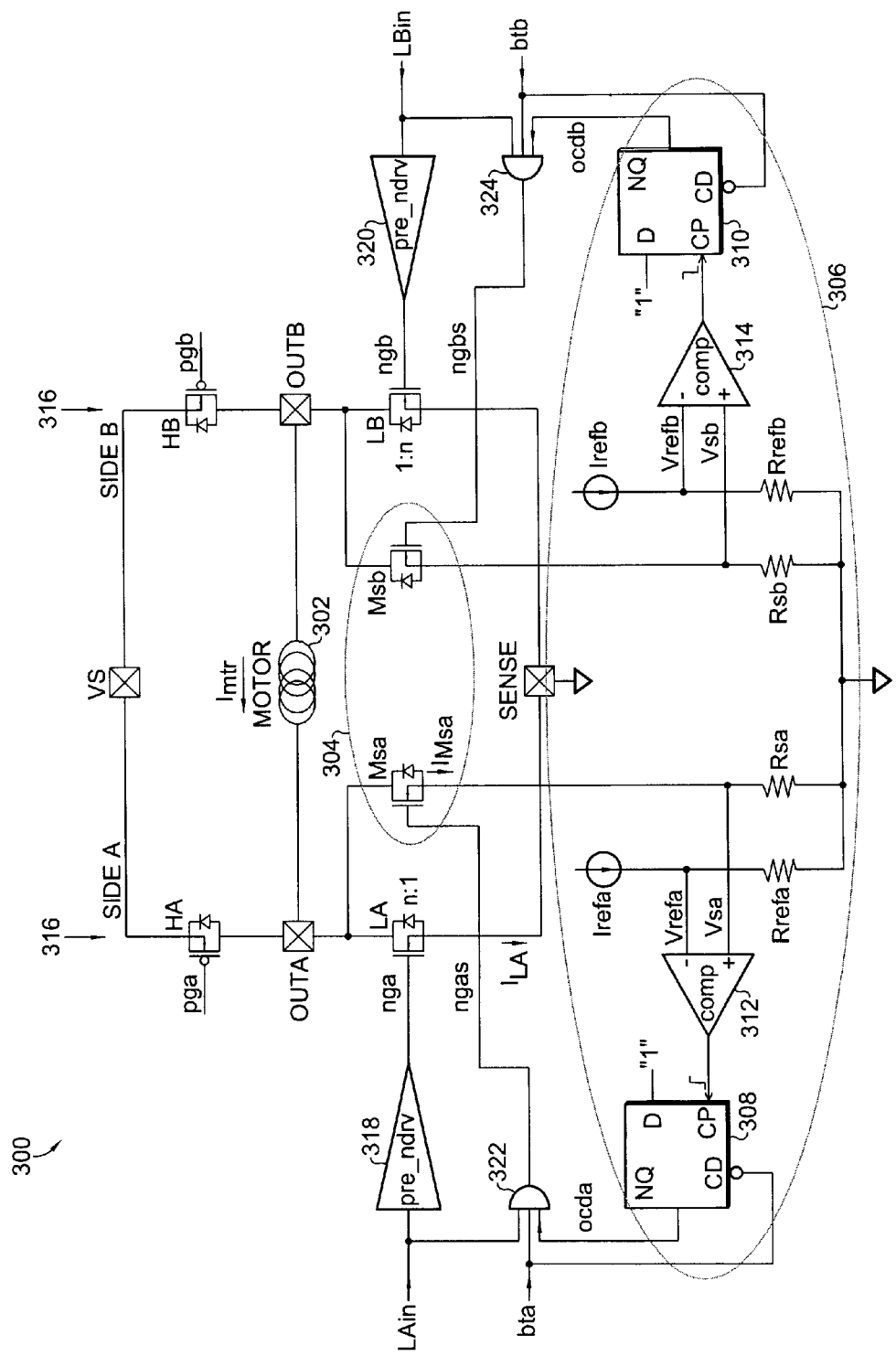
FIG. 3 is a schematic diagram of a prior art DC motor driver circuit including an OCD circuit.
Figure 5:
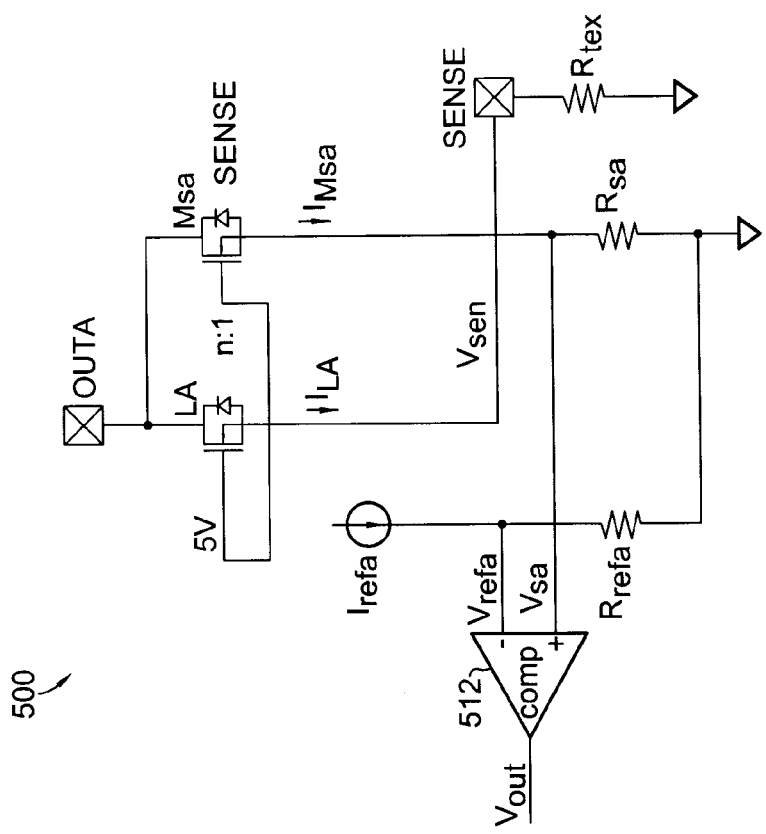
FIG. 5 is an OCD circuit for H-bridge side A for driving a DC Motor according to the prior art with an external sense resistor.
Figure 4:
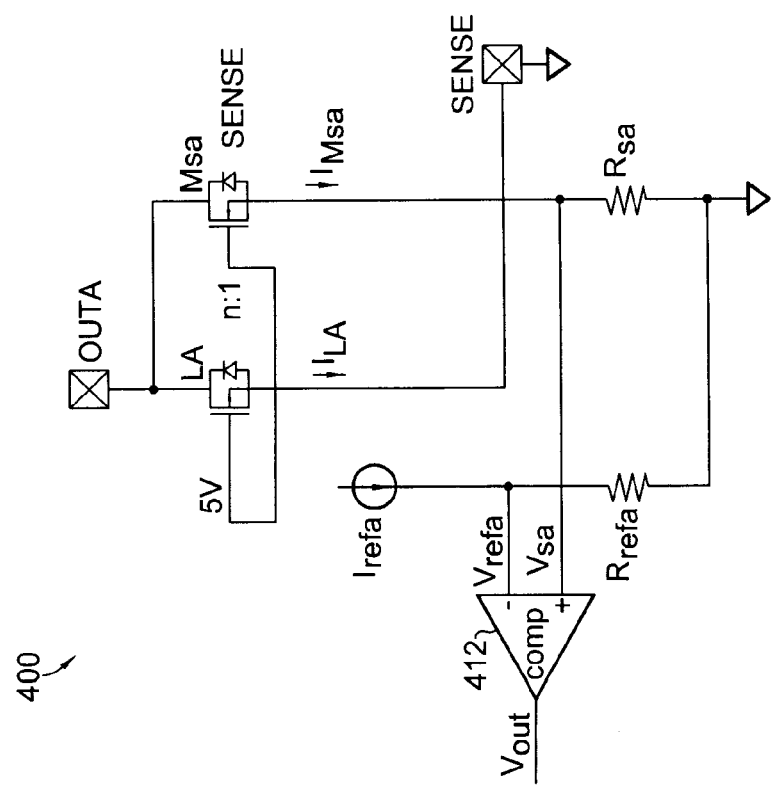
FIG. 4 is an OCD circuit for H-bridge side A for driving a DC Motor according to the prior art without an external sense resistor.

According to the present invention, a flexible motor driver IC 700, including an accurate and effective over current detection circuit for a bipolar H-Bridge 716 is shown in FIG. 7, which includes two level-shifting circuits 726 and 728, a sense portion 704, and a comparison portion 706.

Two level-shifting circuits 726 and 728 are used to guarantee that the $V_{gs}$ of transistors swa or swb does not change with temperature, motor current or SENSE pin voltage. Consequently, switches swa and swb work in triode mode during OCD. Diodes Da and Db are used for blocking current flowing into transistors Xa or Xb when nodes OUTA or OUTB are high, respectively. Constant current sources Ia and Ib have currents in the micro-amp range, which is not significant with respect to the motor current requirement that is several amperes.

In the sense portion 704, the $R_{dsonpw}$ of transistors LA or LB is used as the sense resistor for OCD, and senses the motor current $I_{mtr}$. The switch swa or swb turns on when an OCD condition occurs. $V_{s1}$ is approximately equal to OUTA or OUTB, and follows these nodes if the total resistance of R1 and R2 is much larger than $R_{dson}$ of transistors swa or swb. Resistors R1 and R2 form a resistor divider. Assuming $R_{dson}$ of swa or swb is ignored, then $V_s$ is equal to:

$$V_s = \frac{R2}{R1+R2} \times I_{mtr} \times R_{dsonpw} + V_{SEN} \qquad (17)$$

Where VSEN is the voltage on the SENSE pin, and determined by following equation:

$$V_{SEN} = I_{mtr} \times R_S \qquad (18)$$

The comparison portion 706 includes a $V_{ref}$ generator, a comparator 712 and latch circuit 708. When devices X1 through Xn turn on, the equivalent resistance of $R_{dsoneq}$ is the total $R_{dson}$ of X1 through Xn. The constant current source $I_{ref}$ flows through $R_{dsoneq}$, and $V_{ref}$ can be obtained by the following equation:

$$V_{ref} = I_{ref} \times R_{dsoneq} + V_{SEN} \qquad (19)$$

Assuming $V_s$ equals to $V_{ref}$, that is:

$$V_{ref} = V_S \qquad (20)$$

Substituting (17), (18) and (19) into (20), the $I_{thocd}$ for OCD is obtained:

$$I_{thocd} = \frac{R1+R2}{R2} \times \frac{R_{dsoneq}}{R_{dsonpw}} \times I_{ref} \qquad (21)$$

If devices X1 through Xn are the same type of device as transistors LA and LB, R1 and R2 are same type resistor and a proper value of n is chosen, then $R_{dsoneq}$ and $R_{dsonpw}$ will have similar features. From (17) and (19), it is determined that $V_{ref}$ and $V_s$ have the same variation with process variations and temperature drift. As a result, an accurate threshold current for OCD is determined by equation (21).

Figure 10:
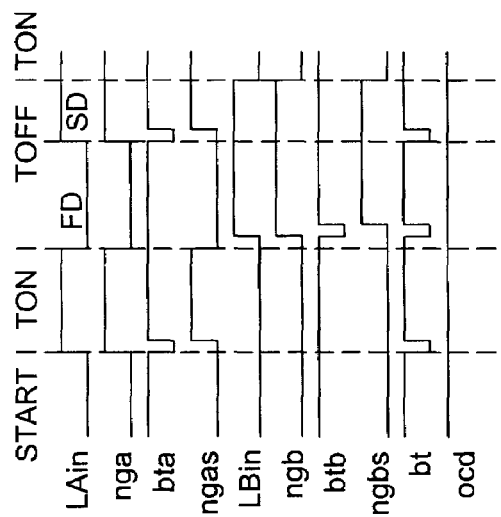
FIGS. 8-10 are relevant waveforms presented without OCD in different decay modes.
Figure 9:
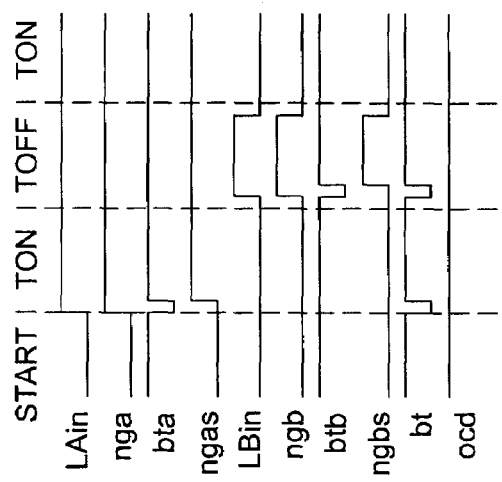
Figure 8:
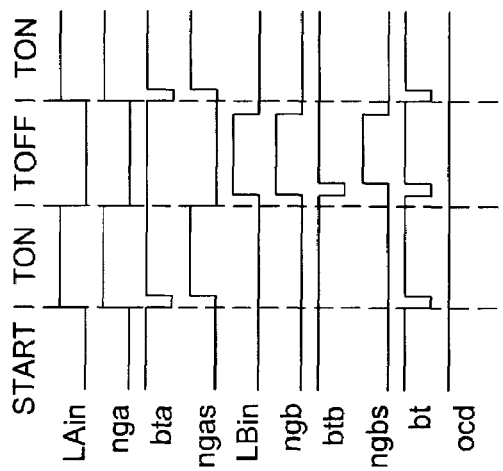

FIGS. 8-10 show waveforms without OCD. FIG. 8 shows the relevant waveforms with a fast decay. FIG. 9 shows the relevant waveforms with a slow decay. FIG. 10 shows the relevant waveforms with a mixed decay.

Figure 12:
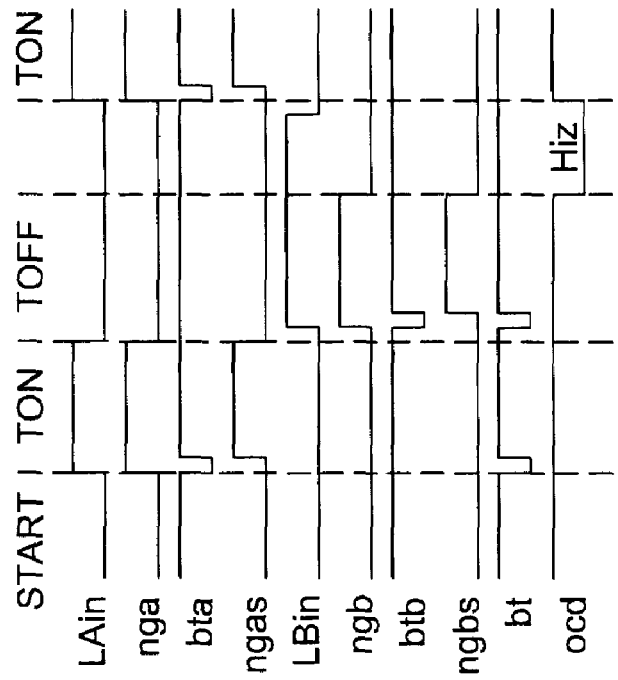
FIGS. 11-12 are relevant waveforms in which OCD occurs during Ton or Toff.
Figure 11:
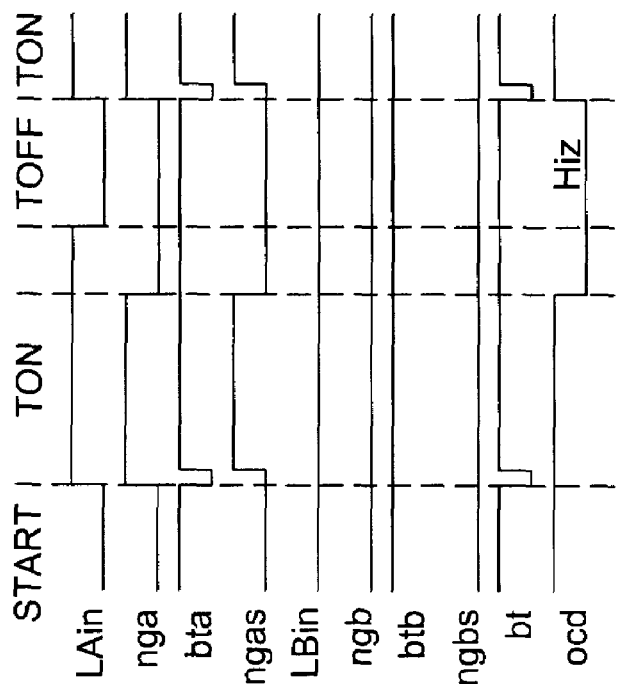

Referring now to FIGS. 11 and 12 the over current phenomenon happens during a long time turn on or a fast decay with synchronous rectification in Toff. FIG. 11 shows OCD occurring during Ton. FIG. 12 shows OCD occurring during a fast decay in Toff.

Figures 13, 14:
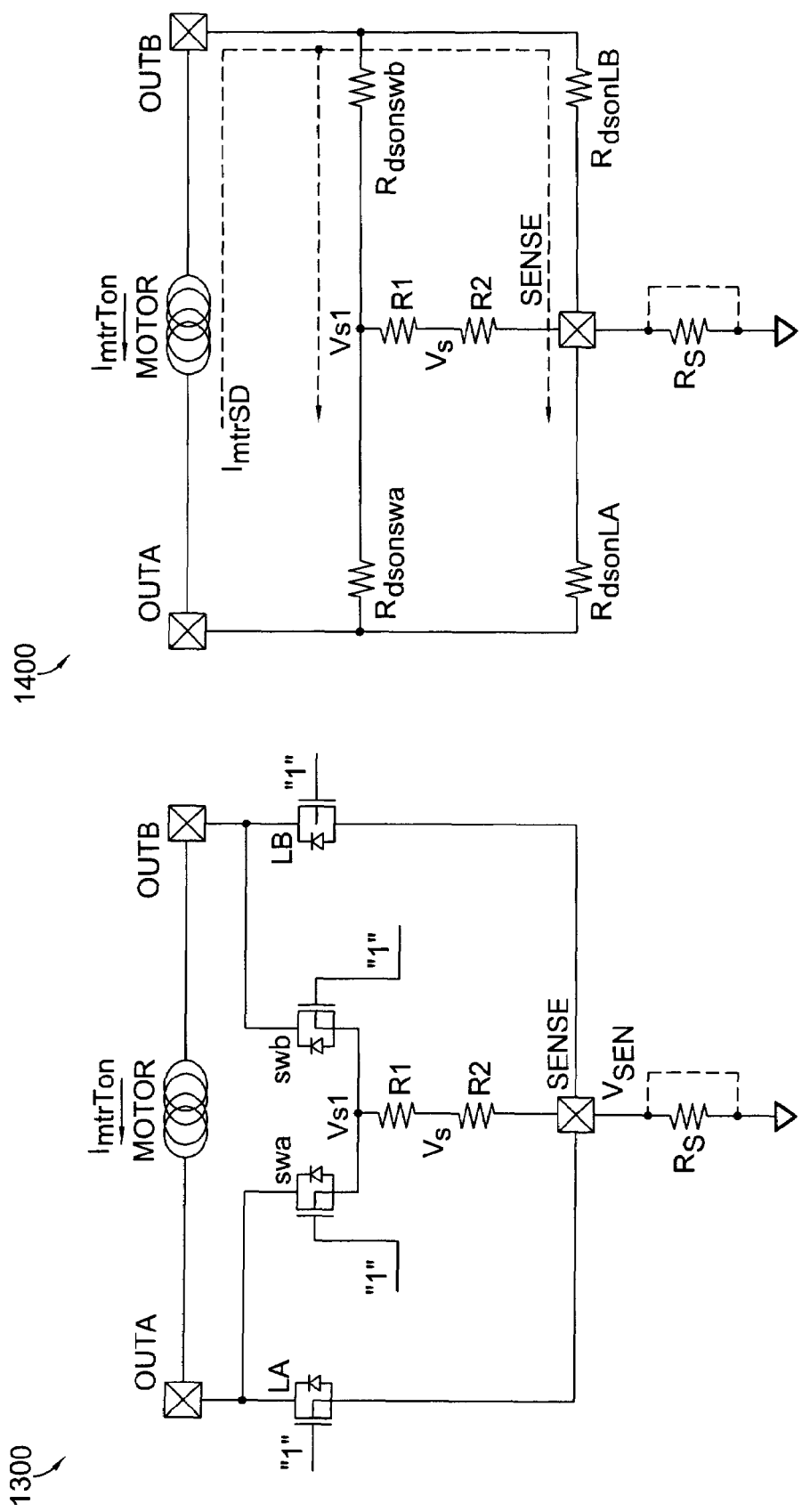
FIGS. 13-14 are schematic diagrams of a simplified and equivalent circuit showing that no OCD occurs during slow decay according to the present invention.

A simplified circuit 1300 is shown for a slow decay in FIG. 13. The equivalent circuit 1400 is shown in FIG. 14. During slow decay the size of power transistor LA or LB is much larger than that of switch swa or swb, and the total resistance of $R_{dsonLA}$ and $R_{dsonLB}$ is much less than that of $R_{dsonswa}$ or $R_{dsonswb}$. Therefore most of the slow decay current of $I_{mtrSD}$ flows through $R_{dsonLB}$ and $R_{dsonLA}$, due to equal power area of LA and LB, and equal switch size of swa and swb. There is no current flowing through resistors R1, R2 and $R_S$, and so $V_s$ is equal to zero. As a result, the over current phenomena doesn't occur during slow decay.

In summary, the proposed method of the present invention has the following advantages. The shared OCD structure can reduce the spread of $I_{thocd}$ for each side in the H-bridge, thus saving precious integrated circuit die area. Voltages $V_s$ and $V_{ref}$ have the same variation with power supply, process and temperature. The $I_{thocd}$ current is more accurate, is substantially insensitive to power supply, process and temperature and SENSE pin voltage, and has the same value for driving a DC motor or a stepper motor.

While the invention has been particularly shown and described with reference to a preferred embodiment thereof, it will be understood by those skilled in the art that various other changes in the form and details may be made without departing from the spirit and scope of the invention.

We claim:

1. A motor driver having over current detection circuitry comprising:

an H-bridge having a first differential input, a second differential input, and a differential output;

a sensing circuit coupled to the differential output of the H-bridge;

a comparison and logic circuit coupled to the sensing circuit;

a pair of pre-driver circuits coupled to the comparison and logic circuit for driving at least one of the differential inputs of the H-bridge; and a pair of level shifters coupled between the comparison and logic circuit and the sensing circuit, wherein each of the pair of level shifters comprises a transistor receiving a reference current at a current path node, and a diode coupled between the current path node and a single-ended node of the differential output.

2. The motor driver of claim 1 wherein the H-bridge comprises:

a first side having a first transistor coupled to a second transistor; and a second side having a third transistor coupled to a fourth transistor.

3. The motor driver of claim 1 wherein the first and third transistors each comprise a power PDMOS transistor.

4. The motor driver of claim 1 wherein the second and fourth transistors each comprise a power NDMOS transistor.

5. The motor driver of claim 1 wherein each of the pair of level shifters further comprises a zener diode coupled to the diode.

6. The motor driver of claim 1 wherein the sensing circuitry comprises a pair of transistors having current paths serially coupled across the differential output.

7. The motor driver of claim 1 wherein the sensing circuitry further comprises a resistive divider coupled to a junction between the pair of transistors having an output coupled to the comparison and logic circuit.

8. The motor driver of claim 1 wherein the comparison and logic circuit provides a logic signal to the pre-driver circuits in an over current condition.

9. An over current detection circuit for an H-bridge; motor driver comprising:

a sensing circuit coupled to a differential output of the H-bridge;

a comparison and logic circuit coupled to the sensing circuit;

a pair of pre-driver circuits coupled to the comparison and logic circuit for driving a differential input of the H-bridge; and a pair of level shifters coupled between the comparison and logic circuit and the sensing circuit, wherein each of the pair of level shifters comprises a transistor receiving a reference current at a current path node, and a diode coupled between the current path node and a single-ended node of the differential output.

10. The motor driver of claim 9 wherein each of the pair of level shifters further comprises a zener diode coupled to the diode.

11. The motor driver of claim 9 wherein the comparison and logic circuit provides a logic signal to the pre-driver circuits in an over current condition.

12. An over current detection circuit for an H-bridge motor driver comprising:

a sensing circuit coupled to a differential output of the H-bridge including a pair of switches each having a control input;

a comparison and logic circuit coupled to the sensing circuit;

a pair of pre-driver circuits coupled to the comparison and logic circuit for driving a differential input of the H-bridge; and a pair of level shifters for shifting the DC voltage on each of the control inputs of the pair of switches, wherein each of the pair of level shifters comprises a transistor receiving a reference current at a current path node, and a diode coupled between the current path node and a single-ended node of the differential output.

13. The motor driver of claim 12 wherein each of the pair of level shifters further comprises a zener diode coupled to the diode.

14. The motor driver of claim 12 wherein the comparison and logic circuit provides a logic signal to the pre-driver circuits in an over current condition.

* * * * *